(12) United States Patent  
Preston et al.

(10) Patent No.: US 8,355,401 B2  
(45) Date of Patent: Jan. 15, 2013

(54) CONTROLLING ACCESS TO A DESTINATION IN A DATA PROCESSING NETWORK

(75) Inventors: Adrian James Preston, Hampshire (GB); David Ware, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/196,199

(22) Filed: Aug. 2, 2011

(65) Prior Publication Data

US 2011/0289173 A1 Nov. 24, 2011

Related U.S. Application Data

(63) Continuation of application No. 12/466,553, filed on May 15, 2009, now Pat. No. 8,023,498.

(30) Foreign Application Priority Data

May 20, 2008 (EP) ..................................... 08156536

(51) Int. Cl.  
*H04L 12/28* (2006.01)

(52) U.S. Cl. .................................................. 370/395.2

(58) Field of Classification Search .................. 370/352, 370/395.2; 709/227, 238, 237  
See application file for complete search history.

(56) References Cited

U.S. PATENT DOCUMENTS

| | | | |
|---|---|---|---|
| 6,324,570 B1 * | 11/2001 | Tonchev et al. | 709/207 |
| 6,990,668 B1 | 1/2006 | Miller et al. | |
| 7,680,940 B2 | 3/2010 | Morris | |
| 7,693,050 B2 | 4/2010 | Achlioptas et al. | |
| 7,835,745 B2 | 11/2010 | Rinne et al. | |
| 7,945,666 B2 * | 5/2011 | Wunner | 709/225 |
| 2004/0205439 A1 | 10/2004 | Carmeli et al. | |
| 2004/0250283 A1 | 12/2004 | Duigenan et al. | |
| 2005/0267896 A1 | 12/2005 | Goodman et al. | |
| 2006/0087985 A1 | 4/2006 | Kakivaya et al. | |
| 2006/0271601 A1 | 11/2006 | Fatula et al. | |

* cited by examiner

*Primary Examiner* — Chandrahas Patel  
(74) *Attorney, Agent, or Firm* — Thomas E. Lees, LLC

(57) ABSTRACT

Access to a device is controlled in a data processing network by receiving a first request from a client to connect to a device where the device is limited to a fixed number of client connections and connecting the client to an available client connection of the device if the fixed number of client connections on the device would not be exceeded by connecting the client. Access is further controlled by testing liveness of a current client connection on the device if the fixed number of client connections on the device would be exceeded by connecting the client and dropping the current client connection if the liveness testing indicates that the current client connection is not live.

14 Claims, 3 Drawing Sheets

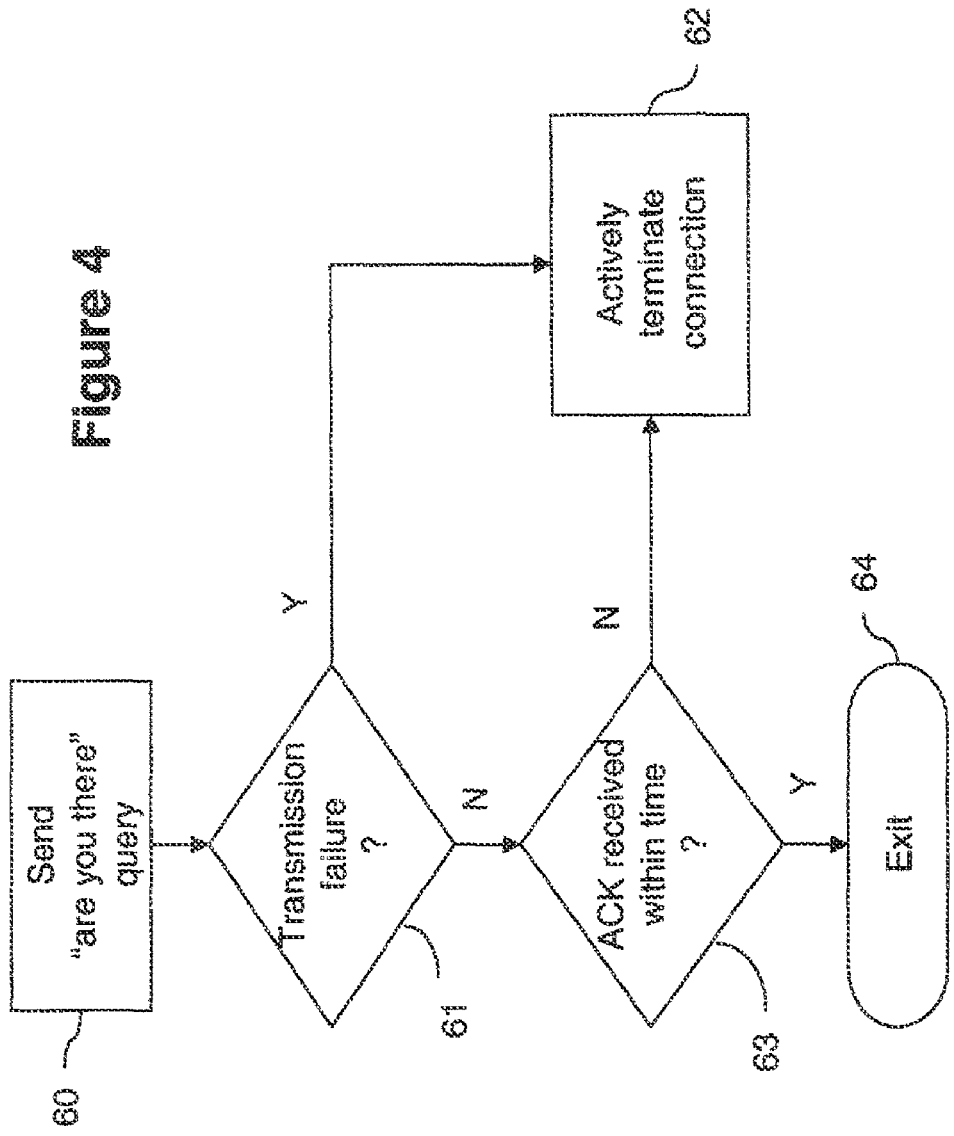

CONTROLLING ACCESS TO A DESTINATION IN A DATA PROCESSING NETWORK

CROSS REFERENCE TO RELATED APPLICATION

This application is a continuation of U.S. patent application Ser. No. 12/466,553, entitled CONTROLLING ACCESS TO A DESTINATION IN A DATA PROCESSING NETWORK, filed May 15, 2009, now allowed, which claims the benefit of European Patent Application No. 08156536.8, filed May 20, 2008, the disclosures of which are incorporated by reference herein.

FIELD OF THE INVENTION

The present invention relates to data processing networks and to controlling access to a destination wherein the destination is limited to a fixed number of requestors.

BACKGROUND

Data processing networks exist in many forms from relatively small local distributed computing networks of computers to large remotely connected heterogeneous networks such as the Internet, which is a loose worldwide confederation of servers and browser clients. Connection and communication between points of a network takes place on several levels or layers, each with its own rules or protocols, ranging from the hardware level, through basic data transmission and transport levels, to the application level. Different multi-layer models have evolved; the best known being the TCP/IP (Transmission Control Protocol/Internet Protocol) suite, which has five layers. Another well known model is the OSI (Open Systems Interconnection) model, which has seven layers.

In networks conforming to TCP/IP, for example, when one party ceases to require a connection to another party, TCP/IP should explicitly transmit data to signal the end of a connection. This frees both parties after which reconnection or a new connection can be established. However, if an application ends suddenly, no "end of connection" information is transmitted and the process at the other end of the connection may not observe its peer has ended. Subsequent attempts to re-establish the connection by the failing application may be rejected by the process at the other end, which may believe it is still connected.

To mitigate the risk of connections remaining in this half ended state forever, TCP/IP provides a liveness checking mechanism which may, optionally, be enabled for all users of a particular TCP/IP implementation (usually this would be all processes run on a particular computer). This mechanism involves periodically asking the party at the other end of a TCP/IP connection if they are still there—and if they do not reply in a timely fashion, assuming the connection has ended. In the scenario described above, this is the mechanism by which the process would eventually notice that a connection had ended, and permit the application to re-establish its connection.

SUMMARY

According to aspects of the present invention, access to a device is controlled in a data processing network by receiving a first request from a client to connect to a device where the device is limited to a fixed number of client connections. Access is controlled by connecting the client to an available client connection of the device if the fixed number of client connections on the device would not be exceeded by connecting the client. Access is further controlled by testing liveness of a current client connection on the device if the fixed number of client connections on the device would be exceeded by connecting the client and dropping the current client connection if the liveness testing indicates that the current client connection is not live. According to further aspects of the present invention, the cost of performing a liveness check is only incurred when it is absolutely required, thereby minimizing impact on bandwidth.

BRIEF DESCRIPTION OF THE DRAWINGS

The present invention will now be described, by way of example only, with reference to a preferred embodiment thereof as illustrated in the accompanying drawings in which:

FIG. 4 is a flow diagram of the steps of a liveness test employed in the system of FIG. 1.

DETAILED DESCRIPTION

Figure 1:
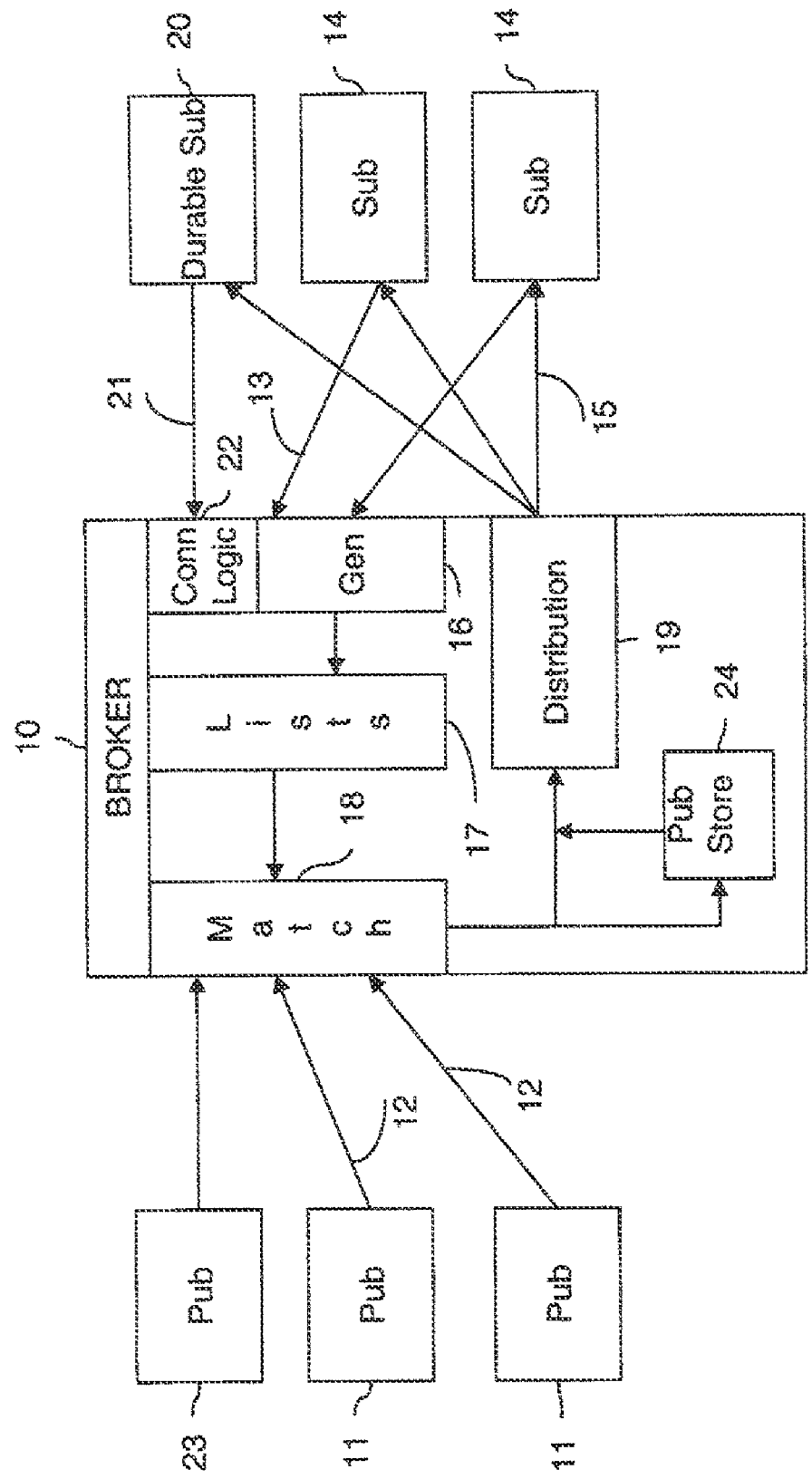
FIG. 1 is a block diagram of a Publish/Subscribe system implementing a method according to an embodiment of the invention.

In FIG. 1 there is shown a block diagram of a Publish/Subscribe system including a message broker computing device 10 in which an embodiment of the present invention is implemented. A number of publishers 11, which are data sources such as computer-based commercial databases, supply items of information, normally referred to as "publications" to the broker 10. A publication includes not only the information content but also the name of the publication topic in a syntax recognizable by the broker. Publishers effectively supply publications at random times to the broker over logical connections 12.

Also logically connected to the broker 10 are a number of subscribers 14, which are client applications residing on input client devices such as terminals or Internet connected personal computers through which human operators submit, via the client devices, requests to be supplied with publications on selected topics by the broker. Subscribers employ the same syntax as the publishers to define topics of interest with the difference that they can also include wildcards in their subscription requests. Use of these wildcards enables the subscribers to request information on a set of topics and not just on a discrete topic.

Subscribers 14 supply the topic or topic set names in which they are interested to the broker 10 on logical connections 13, and list generation software 16 in the broker assembles the requests from each subscriber into subscription lists 17 which are stored in the broker. Match software 18 compares each new publish message from publishers 11 with the stored subscription lists 17 for each subscriber and, if they match, causes distribution software 19 to distribute the matched publication over logical connections 15 to those subscribers which have requested the topic of the publication. For a publication to match a subscribe request in a subscription list, it must be identical to a discrete subscribed topic or included in a set of topics defined in the subscription list, as for example by the use of wildcards.

FIG. 1 shows a simplified system, for ease of explanation, assuming a single broker in point-to-point communication with subscribers but more generally embodiments of the invention is applicable to a collection of brokers in a network. In such networks, publications may be distributed by multi-casting to an intermediate node, for example, rather than by simple broadcasting directly to subscribers. Also, in multi-broker systems, proxy subscription forwarding is generally employed in which a broker forwards subscriptions to other brokers in the network and is itself listed by them as a subscriber.

FIG. 1 also includes a durable subscriber 20, which is a Java Messaging Service ("JMS") client and subscribes to a predefined and pre-registered durable subscription. A durable subscriber, such as subscriber 20, is one which needs to receive messages which have been published on the subscription topic while the subscriber was inactive. If there is no active subscriber for a durable subscription, the JMS compliant broker 10 retains the subscription's messages until they are received by the subscriber, until they expire, or until the durable subscription is deleted. This enables subscriber applications, such as subscriber 20, to operate disconnected from the broker for periods of time and then reconnect to the broker and process messages that were published during their absence.

The durable subscriber 20 connects to the broker on a logical connection 21, through connection logic 22, which is effectively part of the subscription list generating software 16. In FIG. 1, one publisher 23, which in general is no different from publishers 11, is assumed to publish messages on the durable subscription topic. In connection with FIG. 2 below, the connection logic 22 determines whether a subscription request from subscriber 20 for the topic defined in the durable subscription can be listed in subscription list 17 and thus whether subscriber 20 can effectively be connected or reconnected to receive publications on the durable topic.

This determination depends solely on whether there is or there appears to be an existing connection for the durable subscription, since only one subscriber at a time may connect to the durable subscription topic. If there is no other connection, the subscriber 20 is listed and match logic 18 matches incoming publications on the durable subscription topic from publisher 23 and passes the publications to distribution logic 19 for transmission to subscriber 20.

If there is a conflict, subscriber 20 is not allowed to access the topic of the durable subscription. However, any publications matching the topic are stored in the broker in store 24 although they are not published to the subscriber.

Figure 2:
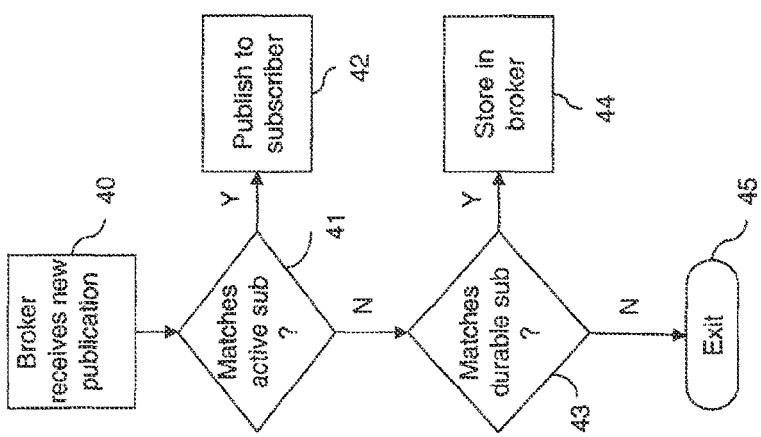
FIG. 2 is a flow diagram illustrating the use of durable subscriptions in the system of FIG. 1.

This behavior is conventional in JMS enabled messaging systems and is illustrated further in the flow diagram of FIG. 2. In step 40, a new publication is received by the broker 10. In step 41, the matching software 18 attempts to match the publication topic with active subscriptions listed in list 17. If an active subscription exists, the publication is forwarded to the listed subscribers in step 42.

If however, there is no matching subscriber, the matching software determines in step 43 whether there is nevertheless a durable subscription for the topic. If there is, in step 44, the publication is stored by the broker in publications store 24. If there is no active or durable subscription, the routine exits without action at step 45.

Figure 3:
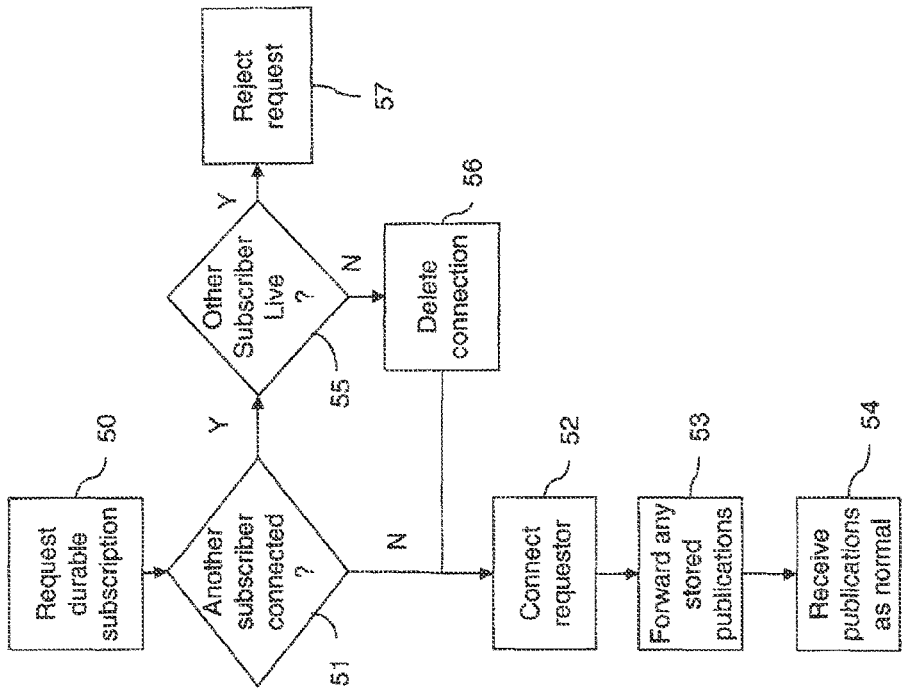
FIG. 3 is a flow diagram illustrating a method of an embodiment of the invention for controlling access requests for durable subscriptions in the system of FIG. 1

In FIG. 3, the possibilities arising when subscriber 20 requests or attempts to resume the durable subscription are illustrated. The durable subscription request is shown as step 50. In step 51, a test is made as to whether another subscriber is already connected. If not, the subscription may be resumed and subscriber 20 is reconnected by distribution logic 19 in step 52. If the request was a resubscription, publications on the topic which were stored in store 24 while the durable subscription was inactive are forwarded in step 53. After that, subscriber 20 receives any subsequent publications as normal in step 54.

However, if subscriber 20 had terminated its connection abnormally so that its disconnection was not recognized by broker 10, it would appear to connection logic 22, as a result of step 51, that a subscriber was already connected to receive the durable subscription. According to a preferred embodiment of the invention in this event, the connection logic 22 immediately initiates a liveness test in step 55 to check the apparent current connection. If this indicates the apparent subscriber connection is not in fact live, the corresponding record of the connection in logic 22 is deleted in step 56. The requesting subscriber 20 is then reconnected to resume its subscription as in steps 52, 53 and 54. If the liveness test shows that the current connection is alive, then the request to resume by subscriber 20 is rejected in step 57. This scenario may arise in systems where the durable subscriber is cloned for workload balancing and scaling purposes. In this situation, one of the cloned subscribers (instances) may have failed or had a connection problem, causing another instance immediately to try to reconnect.

If the current connection is not live, then, in addition to deleting the record in logic 22, the system may also roll back any work to date within the scope of a current transaction.

With reference to FIG. 4, the liveness check works as follows:

1. The message broker, in step 60, transmits data with the semantic of "are you there?" to the apparently connected subscriber (client). If the attempt to transmit the data fails, it assumes (step 61) that the client has disconnected, actively disconnects the client, in step 62 and cleans up any resources that the client is using (e.g. roll back transactions etc). Otherwise the messaging provider waits for a predefined period of time for a response.

2. The client should immediately acknowledge the receipt of "are you there?" by transmitting an acknowledgement.

3a) if the message broker does not receive a response inside its predefined wait period, it assumes (step 63) that the client has disconnected. The message broker will then actively disconnect the client (step 62) to ensure it really is disconnected and clean up any resources that the client is using (e.g., roll back transactions, etc.).

3b) if the message broker receives a response then it assumes that the subscriber is still active and takes no action, exiting at step 64.

It will be realized that the method described in connection with FIGS. 1 to 4 can be modified to handle different cardinality conditions, that is, a different permitted number of connections.

It will also be realized that the method is not restricted to the durable subscription example described in detail but may be employed in other contexts. Within messaging systems, one of these other contexts may be the "Receive Exclusive" restriction in point-to-point messaging as to the number of sources allowed to put data on a particular message queue.

Other networked applications, for example, in the field of distributed computing can also benefit from the invention. For example, some operating systems have a "single-user mode" at which point they enforce a policy whereby only a single user can log-in to perform administrative actions. Also, some database systems have an "administration mode," which again limits the set of users that can connect to the database.

The invention claimed is:

1. A method of controlling access to a device in a data processing network, the method comprising:
   receiving a first request from a client to connect to a device implemented as a message broker in the data processing network that comprises a messaging system, where the device is limited to a fixed number of client connections, wherein the client is a subscriber to a message on topics published to the message broker;
   connecting the client to an available client connection of the device if the fixed number of client connections on the device would not be exceeded by connecting the client;
   testing liveness of a current client connection on the device if the fixed number of client connections on the device would be exceeded by connecting the client;
   dropping the current client connection if the liveness testing indicates that the current client connection is not live; and
   storing the message in a repository, wherein:
      the message matches a durable subscription previously registered in respect of the subscriber;
      the message persists even when the subscriber is disconnected, and
      the fixed number of client connections are configured so that only one subscriber is permitted to be associated with one durable subscription at any one time, whereby, in response to failure of the liveness test, the previous registration to the durable subscription is deleted enabling a new subscriber connection to resume the durable subscription.

2. The method of claim 1, wherein:
   receiving a first request comprises receiving the first request including operations for putting messages on a destination queue.

3. The method of claim 1, further comprising:
   determining whether the fixed number of available client connections on the device would be exceeded by connecting the client before connecting the client to an available client connection of the device if the fixed number of client connections on the device would not be exceeded by connecting the client.

4. The method of claim 1 wherein the new subscriber connection is a reconnection of the client that is the subscriber.

5. The method of claim 1 wherein testing liveness further comprises:
   sending a second request for acknowledgment to the subscriber; and
   determining that the liveness test has failed if the acknowledgment is not received.

6. The method of claim 5 wherein determining that the liveness test has failed further comprises:
   disconnecting the subscriber, and
   rolling back any work in progress for that subscriber.

7. The method of claim 1 further comprising:
   implementing the device as having the fixed number of client connections greater than one;
   wherein:
      testing liveness of a current client connection further includes testing the connection to each client connection in succession and connecting the client to an available client connection corresponding to the first failure of the liveness test on any connection.

8. A computer-readable storage device with an executable program for controlling access to a device in a data processing network, wherein the program instructs a processor to perform:
   receiving a first request from a client to connect to a device implemented as a message broker in the data processing network that comprises a messaging system, where the device is limited to a fixed number of client connections, wherein the client is a subscriber to a message on topics published to the message broker;
   connecting the client to an available client connection of the device if the fixed number of client connections on the device would not be exceeded by connecting the client;
   testing liveness of a current client connection on the device if the fixed number of client connections on the device would be exceeded by connecting the client;
   dropping the current client connection if the liveness testing indicates that the current client connection is not live; and
   storing the message in a repository, wherein:
      the message matches a durable subscription previously registered in respect of the subscriber;
      the message persists even when the subscriber is disconnected, and
      the fixed number of client connections are configured so that only one subscriber is permitted to be associated with one durable subscription at any one time, whereby, in response to failure of the liveness test, the previous registration to the durable subscription is deleted enabling a new subscriber connection to resume the durable subscription.

9. The computer-readable storage device of claim 8 wherein the new subscriber connection is a reconnection of the client that is the subscriber.

10. The computer-readable storage device of claim 8 wherein testing liveness further comprises:
    sending a second request for acknowledgment to the subscriber; and
    determining that the liveness test has failed if the acknowledgment is not received.

11. The computer-readable storage device of claim 10 wherein determining that the liveness test has failed further comprises:
    disconnecting the subscriber, and
    rolling back any work in progress for that subscriber.

12. The computer-readable storage device of claim 8 wherein the program further instructs the processor to perform:
    implementing the device as having the fixed number of client connections greater than one;
    wherein:
       testing liveness of a current client connection further includes testing the connection to each client connection in succession and connecting the client to an available client connection corresponding to the first failure of the liveness test on any connection.

13. The computer-readable storage device of claim 8, wherein:
    receiving a first request comprises receiving the first request including operations for putting messages on a destination queue.

14. The computer-readable storage device of claim 8, wherein the program further instructs the processor to perform:
    determining whether the fixed number of available client connections on the device would be exceeded by connecting the client before connecting the client to an available client connection of the device if the fixed number of client connections on the device would not be exceeded by connecting the client.

* * * * *